United States Patent Office 2,741,281
Patented Apr. 10, 1956

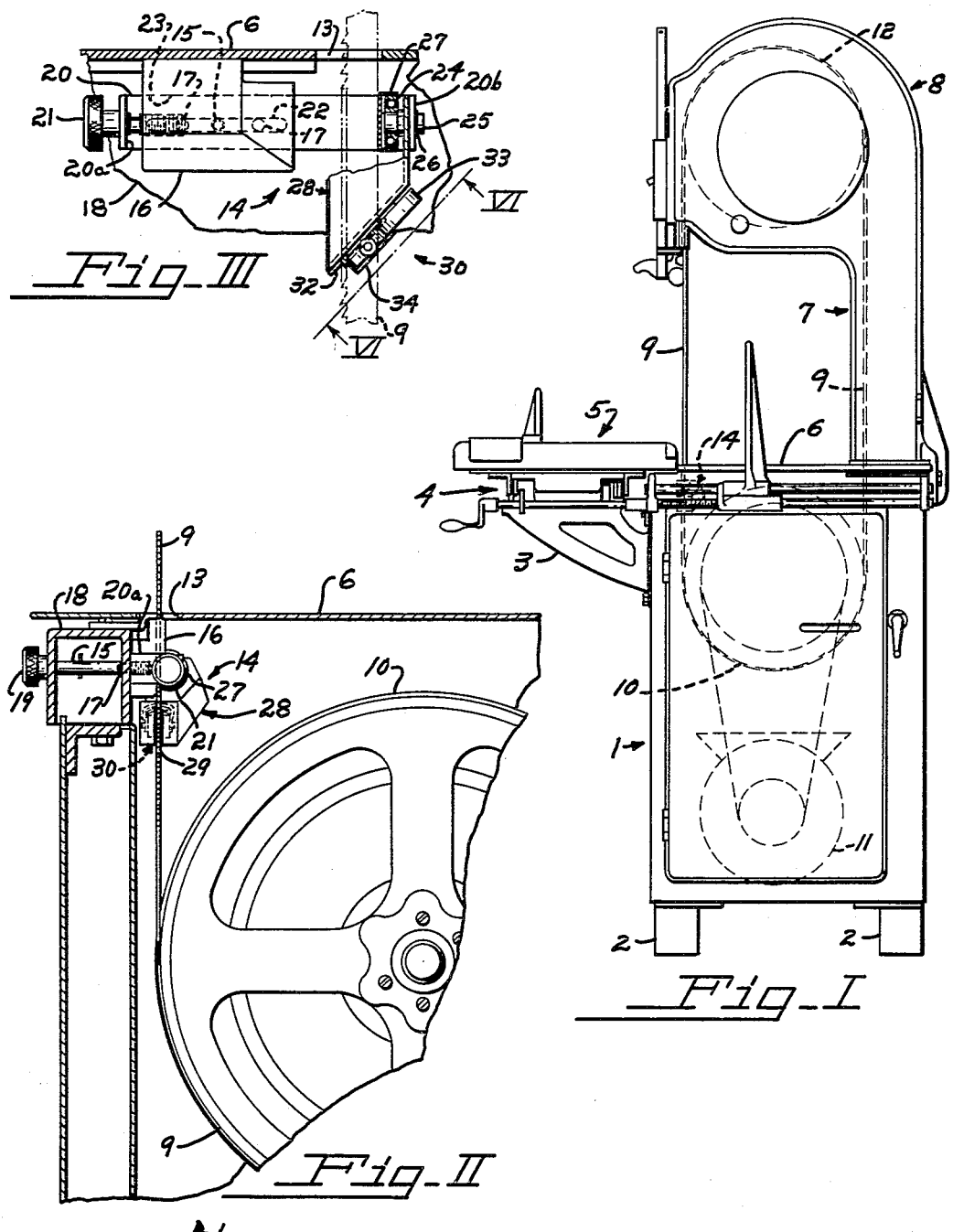

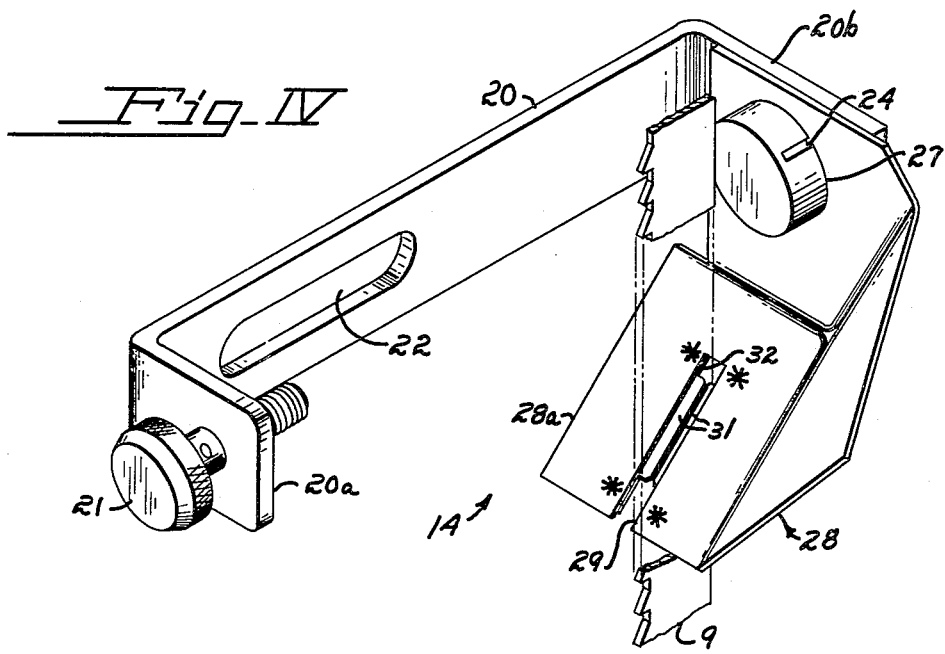
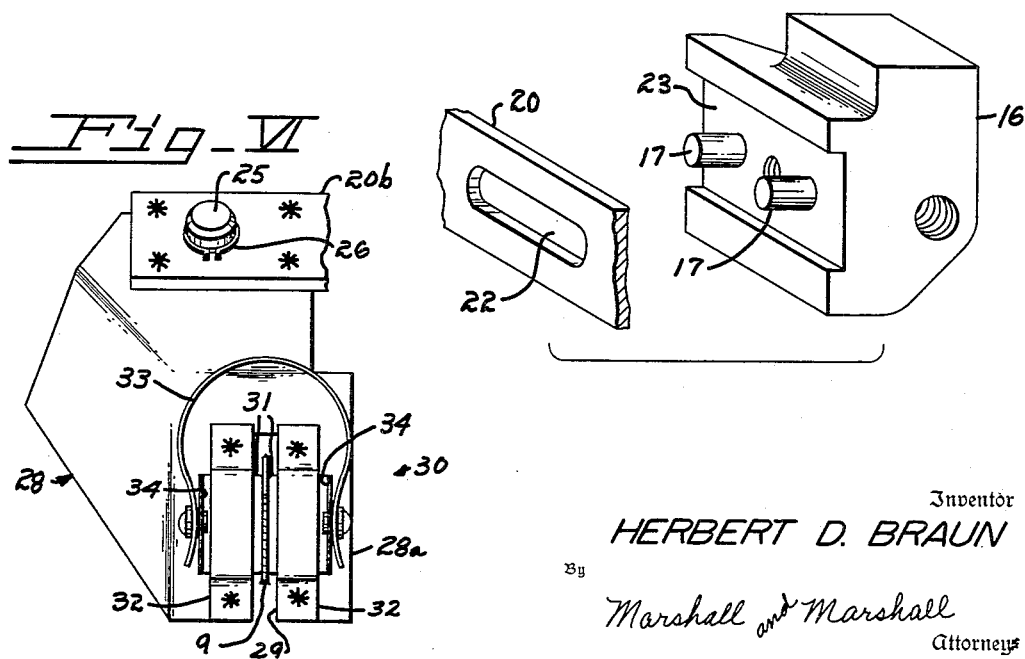

2,741,281

BAND SAW BLADE SCRAPER

Herbert D. Braun, Toledo, Ohio, assignor to Toledo Scale Company, Toledo, Ohio, a corporation of New Jersey Application February 7, 1952, Serial No. 270,452

3 Claims. (Cl. 143—158)

This invention relates to meat cutting band saws and particularly to a cleaning and guiding unit for a band saw blade.

It is a principal object of this invention to provide a pair of resilient scrapers for a band saw blade which are slidably mounted to facilitate maintenance of equal pressure on both sides of the blade during any sidewise movement of the blade.

A further object is to provide resilient band saw blade scrapers which are maintained in contact with the sides of the blade at all times to scrape clinging materials therefrom.

A still further object of this invention is to provide a combination blade cleaner and guide which can be removed and replaced as a unit.

It is still another object of this invention to provide band saw blade cleaning and guiding means which permit a limited amount of sidewise motion of the blade without creating excess tension in the blade.

Other objects and advantages will be apparent from the following description, in which reference is had to the accompanying drawings.

According to the invention, as a band saw blade carrying tallow, bone dust, meat particles, etc., moves downwardly through an aperture in the table supporting the article being cut, a pair of slidably mounted resiliently biased scrapers engaging the sides of the blade, scrape the tallow, etc., therefrom. The scrapers in combination with a horizontally adjustable thrust bearing aid in guiding the blade around a lower of two saw wheels.

In the drawings:

Figure I is an elevational view of a band saw machine embodying the invention.

Figure II is a sectional view illustrating the means for fastening the scraping and guiding unit to the machine, parts being broken away.

Figure III is a fragmentary elevation of the adjustable scraping and guiding unit illustrating its position relative to the path of movement of the saw blade.

Figure IV is an isometric view of the adjustable scraping and guiding unit.

Figure V is an isometric view of the guide block illustrating the method by which the scraping and guide unit may be adjusted.

Figure VI is a view taken along line VI—VI of Figure III showing the slidably mounted resiliently biased blade scrapers.

The meat cutting band saw illustrated in Figure I has a base housing 1 which is erected on four short closed legs 2, and to which is attached, by means of forwardly extending brackets 3, a runway 4 on which is mounted a reciprocable table 5. The top of the housing 1 is formed by a stationary table 6 which lies in the same plane as the reciprocable table 5. Together, the tables 5 and 6 form a working surface for supporting meat to be cut on the machine.

An upright column 7 surmounts the rear center portion of the housing 1 and enlarges at its upper limit to become an overhanging head 8, thereby forming a throat between the underside of the head 8 and the table 6. A continuous band saw blade 9 passes vertically downward in the throat space around a lower saw wheel 10 driven by a motor 11 in the housing 1, then upwardly around an upper saw wheel 12 journaled in the head 8.

An aperture 13 is provided in the table 6 to provide a passageway for the blade 9. Located beneath the table substantially along the path of the blade is an adjustable combination scraping and guiding unit 14 which is held in place by a locking screw 15 threaded into a guide block 16 of the unit 14. A pair of pins 17 fixed to the block 16 engage in holes drilled in a frame portion 18 of the housing 1, thereby assuring correct positioning of the block 16 and unit 14 at all times. The locking screw 15 is journaled through the frame portion 18 and has a knurled thumb nut 19 manually operable from the exterior of the machine. The unit 14 can therefore be installed or removed simply by tightening or loosening the thumb nut 19.

A horizontally slidable bar 20 is movable in a direction perpendicular to the cutting edge of the blade 9 by means of rotating a thumb screw 21 journaled in an end portion 20a of the bar 20 bent at right angles to the major portion of the bar. The screw 21 is threaded into the removably mounted guide block 16 fastened to the frame portion 18. Tightening or loosening the screw causes it to move toward or away from the guide block, and thereby positions the bar 20 accordingly. The bar 20 is provided with a slot 22 the ends of which act to limit travel of the bar, said ends being arranged to engage the pins 17 protruding through the bar. It will be noticed that the slot 22 is longer than the distance between the pins, and the diameter of the pins 17 is slightly smaller than the width of the slot 22.

The slidable bar 20 is guided in a milled-out portion 23 of the guide block 16, the depth of which is substantially the same as the thickness of the bar, thereby necessitating loosening the locking screw 15 to allow adjustment of the thumb screw 21 to correctly position the unit 14. This eliminates the possibility of movement of the unit 14 due to play caused by wear in any of the adjustable parts once the unit has been adjusted and the locking screw 15 has been tightened.

The slidable bar 20 has its other end portion 20b bent at a right angle to support a thrust bearing 24 mounted on a short shaft 25 held in a hole drilled in the bent end portion 20b of the bar 20. The shaft 25 is secured to the bar 20 by means of a C-shaped spring retainer clip 26 engaged in a turned-down neck portion of the shaft 25. The thrust bearing 24 is provided with a stainless steel cap 27 against which the back edge of the blade 9 bears. The axis of the bearing 24 is perpendicular to the cutting edge of the blade 9 and is offset slightly from the path of the blade as shown in Figure II to allow the bearing to rotate more freely as the blade bears against it.

Spot-welded to the bent end portion 20b of the bar 20 is a substantially triangular inverted pyramidal-shaped bracket 28 with an inclined portion 28a having a three-sided slot 29 through which the blade 9 passes. A blade scraping mechanism 30 is slidably mounted on the underside of the inclined portion 28a of the bracket 28 and consists of a pair of scrapers 31 laterally contacting the sides of the blade 9 and inclined downwardly toward the cutting edge of the blade, a pair of guides 32 fixed to the underside of the bracket in which the scrapers 31 are laterally slidable with respect to the path of movement of the blade 9, and a U-shaped resilient member 33 the arms of which are fastened to bent portions 34 of the scrapers 31. The scrapers are biased inwardly by the arms of the member 33 to maintain the scrapers in contact with the sides of the blade 9 without changing the pressure between the scrapers and the blade during any sidewise movement of the blade.

By constructing a blade scraping mechanism that has scrapers which are both resiliently biased and laterally slidable with respect to the sides of the blade, the adverse effect of creating too much pressure on one side of the blade during any sidewise movement of the blade has been avoided.

The embodiment of my invention herein shown and described is to be regarded as illustrative only and it is to be understood that the invention is susceptible to variation, modification, and change within the spirit and scope of the subjoined claims.

Having described the invention, I claim:

1. In a meat cutting band saw having a work table, in combination, a band saw blade running in a plane perpendicular to the table and passing through an aperture in the table, the blade being mounted for sidewise movement in the aperture, an adjustable member mounted along the path of movement of the blade, there being a slot in the member aligned with the aperture in the work table and through which the blade passes, the slot being wider than the thickness of the blade to permit sidewise movement of the blade, a pair of scrapers located at the sides of the blade to clean material therefrom, guides fastened to the adjustable member and in which the scrapers are laterally slidable toward and away from the sides of the blade, a projection on each of the scrapers remote from the blade, and a U-shaped resilient member extending around the back edge of the blade with its ends fastened to the projections on the scrapers, the resilient member being arranged to maintain the scrapers in constant contact with the sides of the blade during sidewise movement of the blade.

2. In a meat cutting band saw having a work table, in combination, a band saw blade running in a plane perpendicular to the table and passing through an aperture in the table, the blade being mounted for sidewise movement in the aperture, a pair of blade scrapers mounted along the path of movement of the blade, a pair of guides extending laterally toward the sides of the blade in which the scrapers are slidable toward and away from the sides of the blade, the guides having their inwardly directed ends spaced to permit sidewise movement of the blade, and a resilient member substantially surrounding the blade and the scrapers and having its ends fastened to the scrapers to maintain the scrapers in constant contact with the sides of the blade during sidewise movement of the blade.

3. In a meat cutting band saw having a work table, in combination, a continuous band saw blade running in a plane perpendicular to the table and passing through an aperture in the table, the blade being mounted for sidewise movement in the aperture, a pair of blade scrapers arranged to engage the sides of the blade to scrape clinging material therefrom, guides in which the scrapers are laterally slidable toward and away from the sides of the blade, and a U-shaped resilient member substantially surrounding the blade and the scrapers and having its ends fastened to the scrapers to maintain them in constant contact with the sides of the blade before and during sidewise movement of the blade.

References Cited in the file of this patent

UNITED STATES PATENTS

| | | |
|---|---|---|
| 659,088 | McKenzie | Oct. 2, 1900 |
| 1,258,517 | Woods et al. | Mar. 5, 1918 |
| 1,494,774 | Davis | May 20, 1924 |
| 1,643,829 | Biro | Sept. 27, 1927 |
| 2,059,595 | McKeage | Nov. 3, 1936 |
| 2,305,177 | Litty | Dec. 15, 1942 |
| 2,549,718 | Spang | Apr. 17, 1951 |
| 2,572,938 | Lasar | Oct. 30, 1951 |